US012604389B2

(12) United States Patent
Ikedo et al.

(10) Patent No.: US 12,604,389 B2
(45) Date of Patent: Apr. 14, 2026

(54) PLASMA IRRADIATION APPARATUS AND PLASMA-TREATED LIQUID PRODUCTION METHOD

(71) Applicant: FUJI CORPORATION, Chiryu (JP)

(72) Inventors: Toshiyuki Ikedo, Nagoya (JP); Takahiro Jindo, Anjo (JP)

(73) Assignee: FUJI CORPORATION, Chiryu (JP)

( * ) Notice: Subject to any disclaimer, the term of this patent is extended or adjusted under 35 U.S.C. 154(b) by 0 days.

(21) Appl. No.: 18/833,197

(22) PCT Filed: Feb. 24, 2022

(86) PCT No.: PCT/JP2022/007692
§ 371 (c)(1),
(2) Date: Jul. 25, 2024

(87) PCT Pub. No.: WO2023/162102
PCT Pub. Date: Aug. 31, 2023

(65) Prior Publication Data
US 2025/0159790 A1 May 15, 2025

(51) Int. Cl.
*C02F 1/48* (2023.01)
*C02F 1/46* (2023.01)
*H05H 1/24* (2006.01)

(52) U.S. Cl.
CPC ........... *H05H 1/247* (2021.05); *C02F 1/4608* (2013.01); *C02F 2201/4612* (2013.01); *H05H 2245/20* (2021.05)

(58) Field of Classification Search
CPC .................................... C02F 1/48; H05H 1/24
See application file for complete search history.

(56) References Cited

U.S. PATENT DOCUMENTS

| | | | | |
|---|---|---|---|---|
| 2014/0014516 A1* | 1/2014 | Kumagai | .............. | C02F 1/4608 |
| | | | | 204/554 |
| 2016/0362317 A1* | 12/2016 | Kimiya | .................... | A61L 2/18 |
| 2017/0233267 A1* | 8/2017 | Takayanagi | ........... | C02F 1/4608 |
| | | | | 210/243 |
| 2019/0322550 A1* | 10/2019 | Weltmann | ........... | H01J 37/3255 |
| 2021/0023250 A1* | 1/2021 | Golkowski | ............. | C01B 15/01 |
| 2021/0322945 A1* | 10/2021 | Brunecker | ........... | B01J 19/0033 |
| 2022/0020571 A1* | 1/2022 | Matsuura | ................. | G01K 7/02 |
| 2024/0026539 A1* | 1/2024 | Kim | ........................ | C23C 16/52 |

FOREIGN PATENT DOCUMENTS

| | | | | |
|---|---|---|---|---|
| CN | 110015729 A | * | 7/2019 | ............... C02F 1/48 |
| JP | 2013-258159 A | | 12/2013 | |
| JP | WO 2020/026324 A1 | | 2/2020 | |

OTHER PUBLICATIONS

International Search Report issued May 10, 2022 in PCT/JP2022/007692 filed Feb. 24, 2022, 3 pages.

* cited by examiner

*Primary Examiner* — Cachet I Proctor
(74) *Attorney, Agent, or Firm* — Oblon, McClelland, Maier & Neustadt, L.L.P.

(57) ABSTRACT

A plasma irradiation apparatus including a container configured to store a liquid to be treated; a plasma generating device configured to generate plasma to irradiate the liquid to be treated stored in the container; and a container temperature measuring instrument configured to measure a temperature of the container.

11 Claims, 13 Drawing Sheets

Z DIRECTION

X DIRECTION

Y DIRECTION

Z DIRECTION

X DIRECTION

PLASMA IRRADIATION APPARATUS AND PLASMA-TREATED LIQUID PRODUCTION METHOD

TECHNICAL FIELD

The present disclosure relates to a technique for producing a plasma-treated liquid by irradiating a liquid to be treated with plasma.

BACKGROUND ART

Patent Literature describes a technique for irradiating a liquid to be treated stored in a container with plasma.

PATENT LITERATURE

Patent Literature 1: WO2020/026324

BRIEF SUMMARY

Technical Problem

An object of the present description is to efficiently produce a plasma-treated liquid by irradiating a liquid to be treated stored in a container with plasma.

Solution to Problem

In order to achieve the above object, the present description discloses a plasma irradiation apparatus including a container configured to store a liquid to be treated, a plasma generating device configured to generate plasma to irradiate the liquid to be treated stored in the container, and a container temperature measuring instrument configured to measure a temperature of the container.

Advantageous Effects

According to the present disclosure, it is possible to efficiently produce a plasma-treated liquid.

DESCRIPTION OF EMBODIMENTS

An embodiment of the present disclosure will be described in detail below based on the accompanying drawings.

Figure 1:
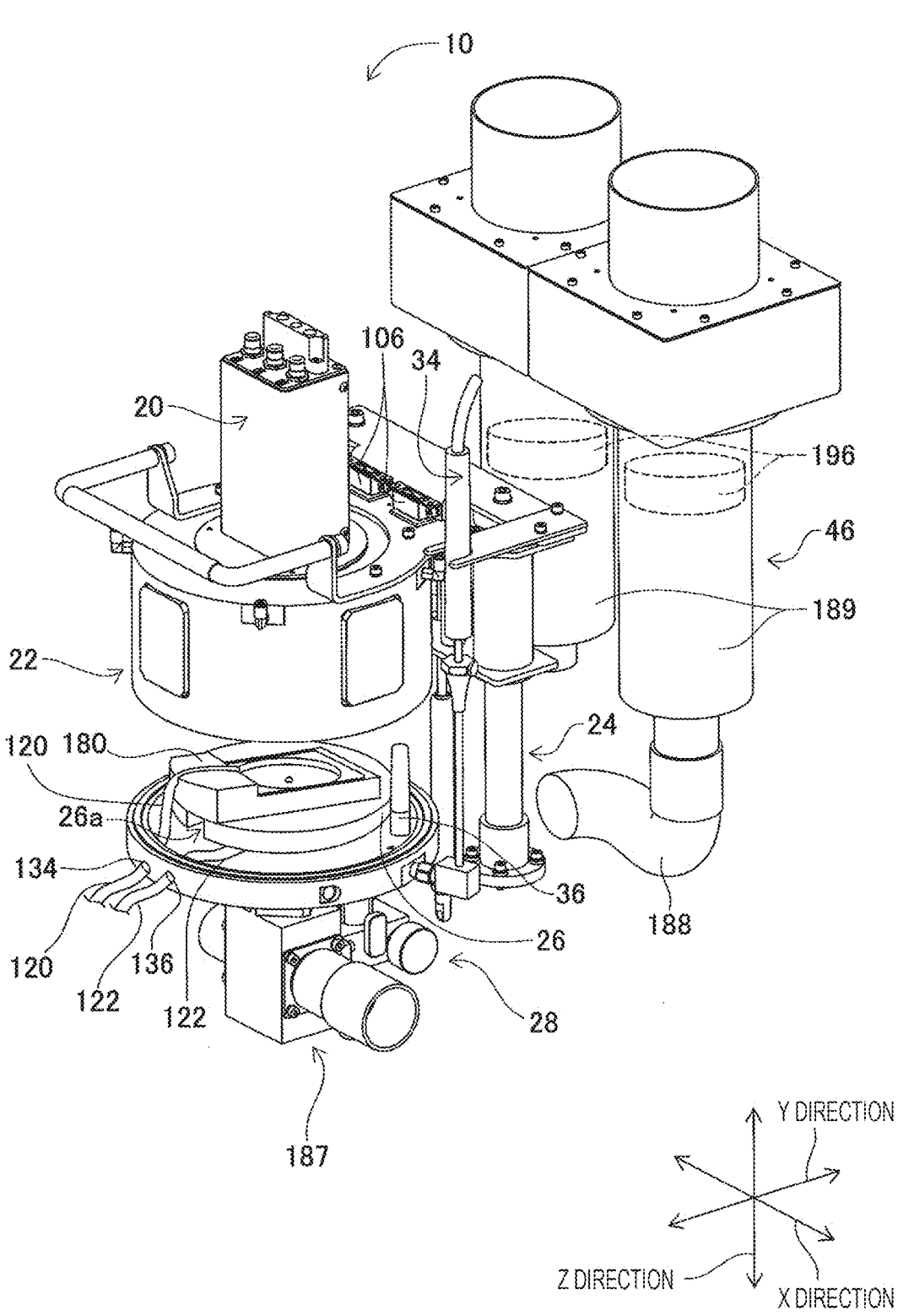
FIG. 1 is a perspective view of an atmospheric pressure plasma irradiation apparatus.

FIG. 1 shows atmospheric pressure plasma irradiation apparatus 10 according to an embodiment of the present disclosure. Atmospheric pressure plasma irradiation apparatus 10 is a device for irradiating a culture solution (an example of a "liquid to be treated") with plasma under atmospheric pressure, and includes plasma generating device 20, cover housing 22, opening and closing mechanism 24, stage 26, lifting and lowering device 28, purge gas supply mechanism 32 (see FIG. 5), concentration detection mechanism 34, hygrometer 36, spectrometer 38 (see FIG. 8), irradiation block temperature measuring instrument 40 (see FIG. 10), device temperature measuring instrument 42 (see FIG. 11), laser light measuring device 44 (see FIG. 12), exhaust mechanism 46, and control device 48 (see FIG. 13). A width direction of atmospheric pressure plasma irradiation apparatus 10 is referred to as an X direction, a depth direction of atmospheric pressure plasma irradiation apparatus 10 is referred to as a Y direction, and a direction orthogonal to the X direction and the Y direction, that is, an up-down direction is referred to as a Z direction.

Figure 2:
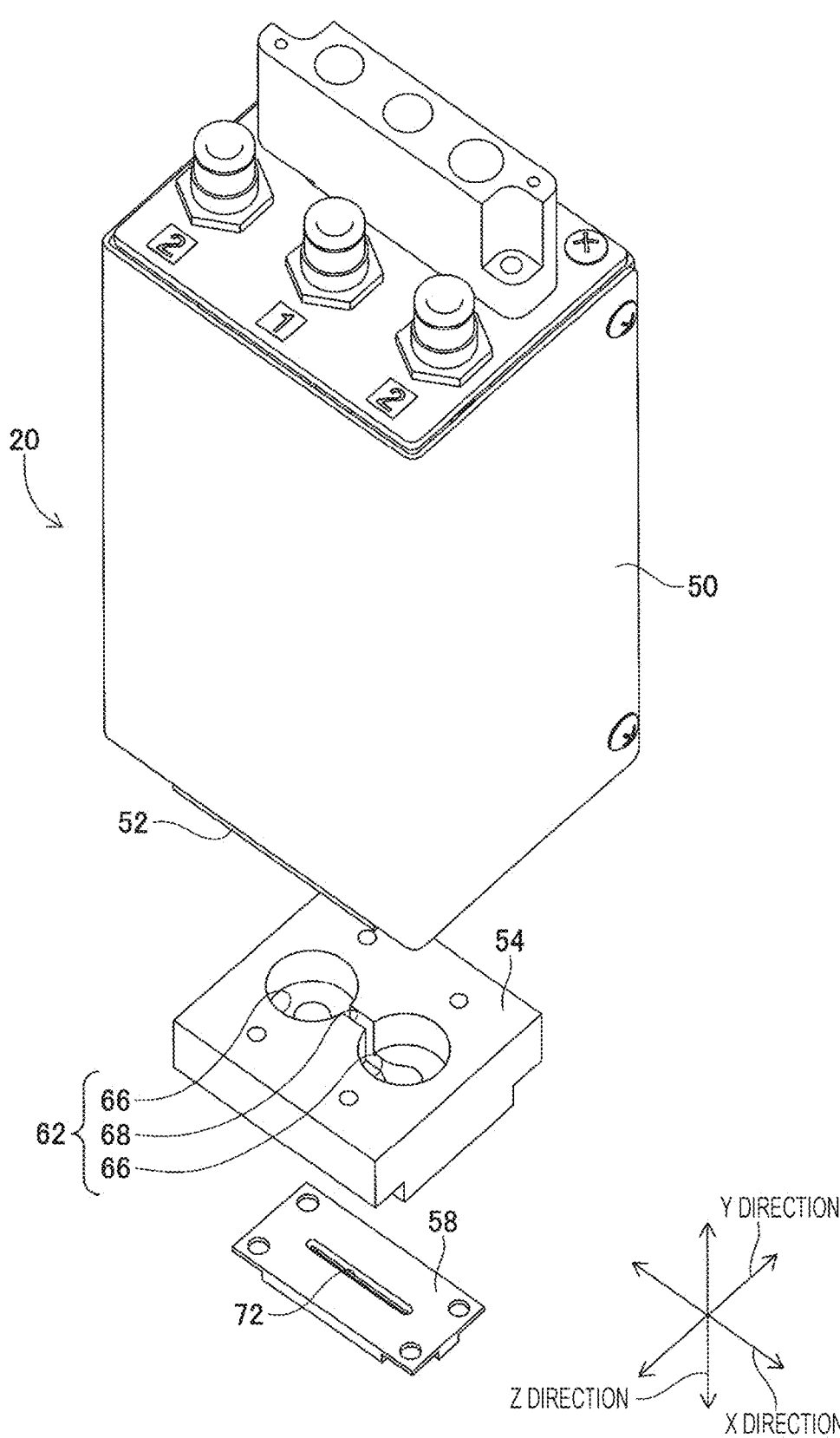
FIG. 2 is an exploded view of a plasma generating device.
Figure 3:
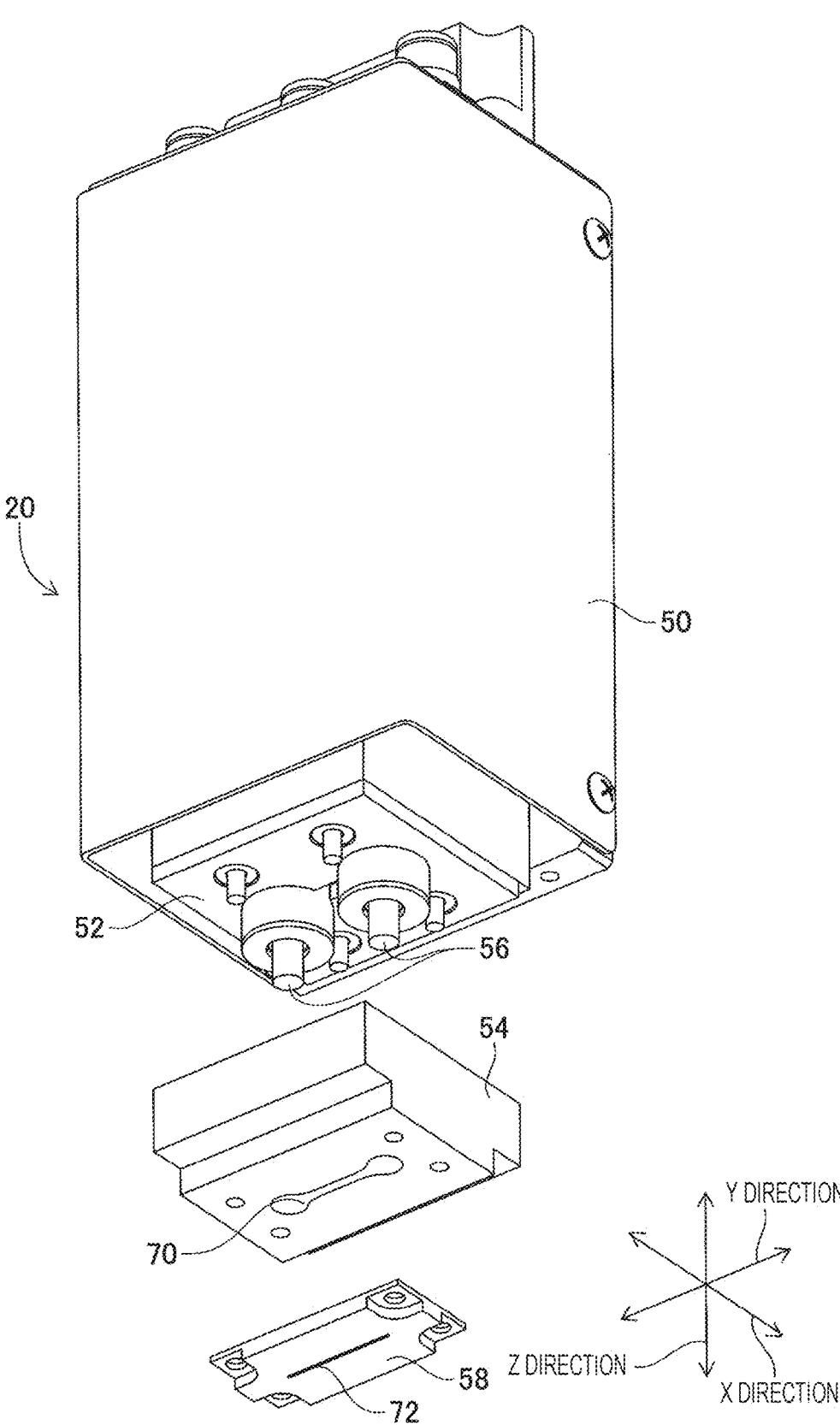
FIG. 3 is an exploded view of the plasma generating device.
Figure 4:
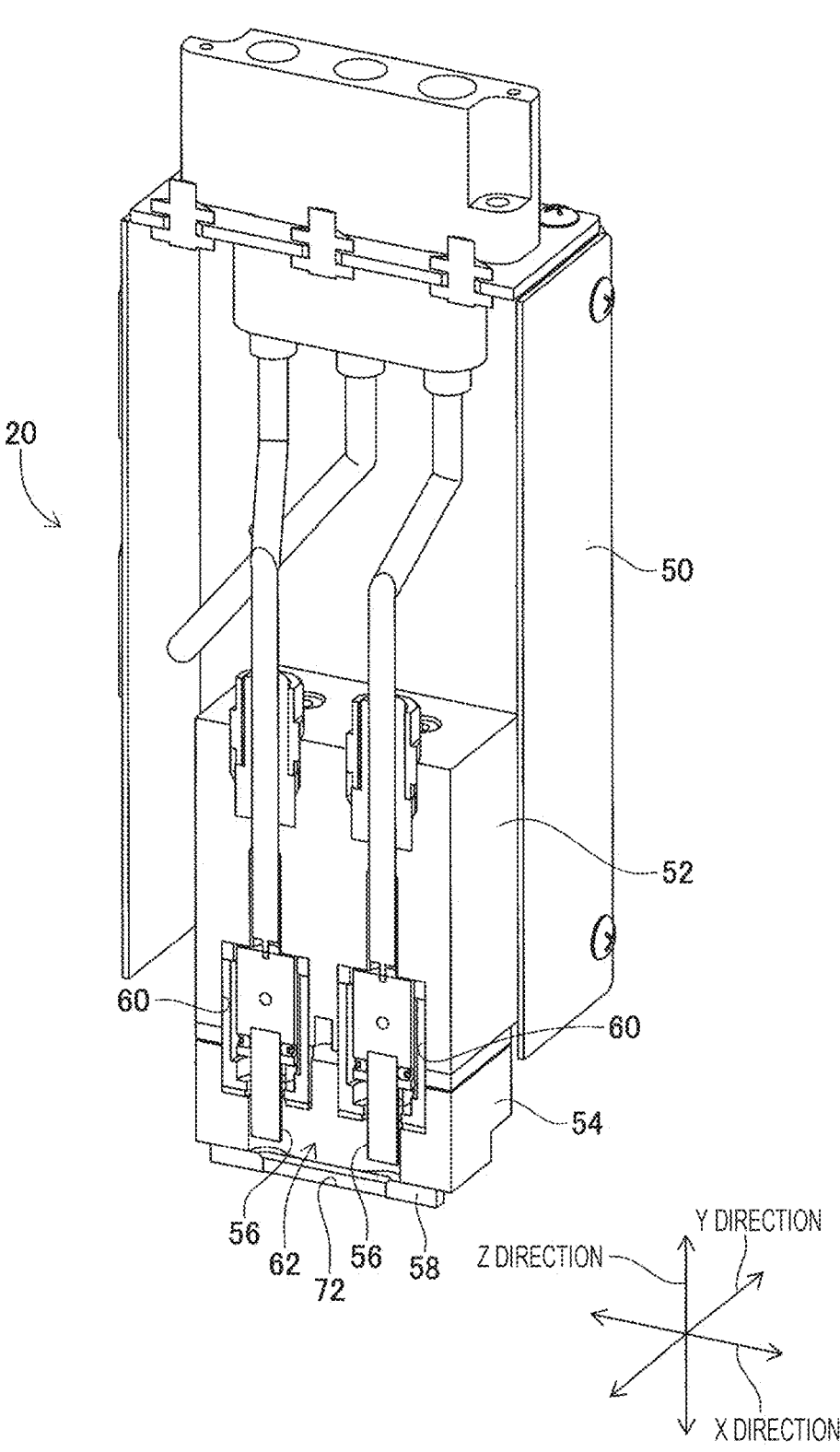
FIG. 4 is a cross-sectional view of the plasma generating device.

As shown in FIGS. 2 to 4, plasma generating device 20 includes cover 50, upper block 52, lower block 54, a pair of electrodes 56, and nozzle block 58. Cover 50 has a substantially covered square cylindrical shape, and upper block 52 is disposed inside cover 50. Upper block 52 has a substantially rectangular parallelepiped shape and is formed of ceramic. A pair of cylindrical recessed sections 60 having a cylindrical shape is formed on a lower surface of upper block 52.

Lower block 54 also has a substantially rectangular parallelepiped shape and is formed of ceramic. Recessed section 62 is formed on an upper surface of lower block 54, and is configured to be provided with a pair of cylindrical recessed sections 66 having a cylindrical shape and connecting recessed section 68 which connects the pair of cylindrical recessed sections 66 to each other. In addition, lower block 54 is fixed to the lower surface of upper block 52 in a state of protruding from a lower end of cover 50, and cylindrical recessed section 60 of upper block 52 and cylindrical recessed section 66 of lower block 54 communicate with each other. Cylindrical recessed section 60 and cylindrical recessed section 66 have substantially the same diameter. In addition, slit 70 passing through a lower surface of lower block 54 is formed on a bottom surface of recessed section 62.

Each of the pair of electrodes 56 is disposed in a cylindrical space defined by cylindrical recessed section 60 of upper block 52 and cylindrical recessed section 66 of lower block 54. The outer diameter of electrode 56 is smaller than the inner diameters of cylindrical recessed sections 60 and 66. Nozzle block 58 has a substantially flat plate shape and is fixed to the lower surface of lower block 54. Ejection port 72 communicating with slit 70 of lower block 54 is formed on nozzle block 58 and ejection port 72 passes through nozzle block 58 in the up-down direction.

Figure 13:
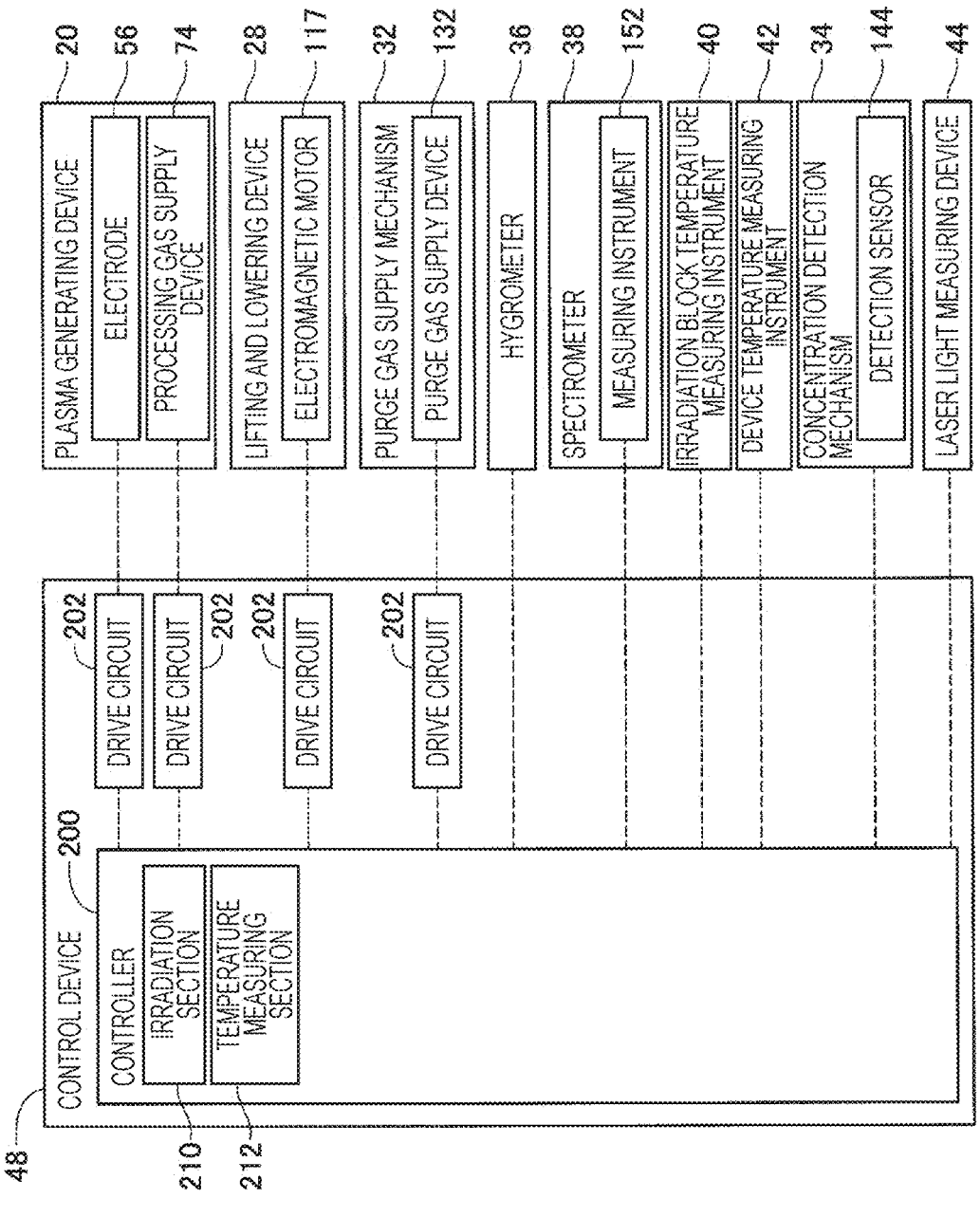
FIG. 13 is a block diagram of a control device.

Plasma generating device 20 further includes processing gas supply device 74 (see FIG. 13). Processing gas supply device 74 is a device that supplies a processing gas in which an active gas such as oxygen and an inert gas such as nitrogen are mixed at an arbitrary ratio, and is connected to cylindrical spaces defined by cylindrical recessed sections 60 and 66, and an upper portion of connecting recessed section 68 via a pipe (not shown). Accordingly, the processing gas is supplied into the inside of recessed section 62 from the gap between electrode 56 and cylindrical recessed section 66 and the upper portion of connecting recessed section 68.

With this structure, plasma generating device 20 ejects plasma from ejection port 72 of nozzle block 58. Specifically, the processing gas is supplied into the inside of recessed section 62 by processing gas supply device 74. At this time, in recessed section 62, a voltage is applied to the pair of electrodes 56, and a current flows between the pair of electrodes 56. Thus, a discharge occurs between the pair of electrodes 56, and the processing gas is converted into plasma by the discharge. Then, the plasma is ejected from ejection port 72 through slit 70.

Figure 5:
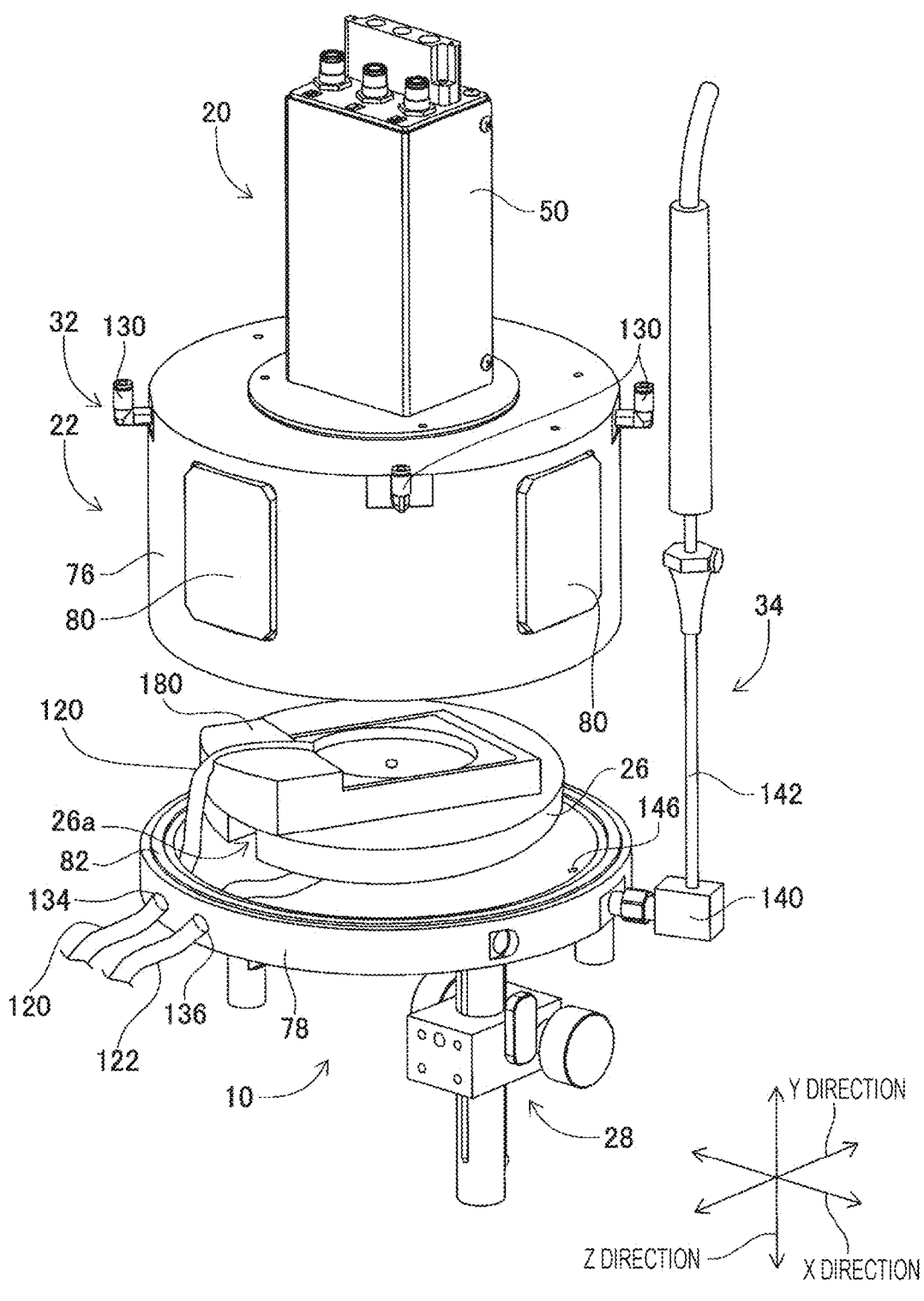
FIG. 5 is a perspective view of the atmospheric pressure plasma irradiation apparatus.

As shown in FIG. 5, cover housing 22 includes upper cover 76 and lower cover 78. Upper cover 76 has a substantially covered cylindrical shape, and a through hole (not shown) having a shape corresponding to lower block 54 of plasma generating device 20 is formed in the lid section of upper cover 76. Cover 50 of plasma generating device 20 is fixed in a state of standing upright on the lid section of upper cover 76 to cover the through hole. For this reason, lower block 54 and nozzle block 58 of plasma generating device 20 protrude toward the inside of upper cover 76 to extend in the Z direction. As a result, the plasma generated by plasma generating device 20 is ejected in the Z direction from ejection port 72 of nozzle block 58 toward the inside of upper cover 76.

Figure 12:
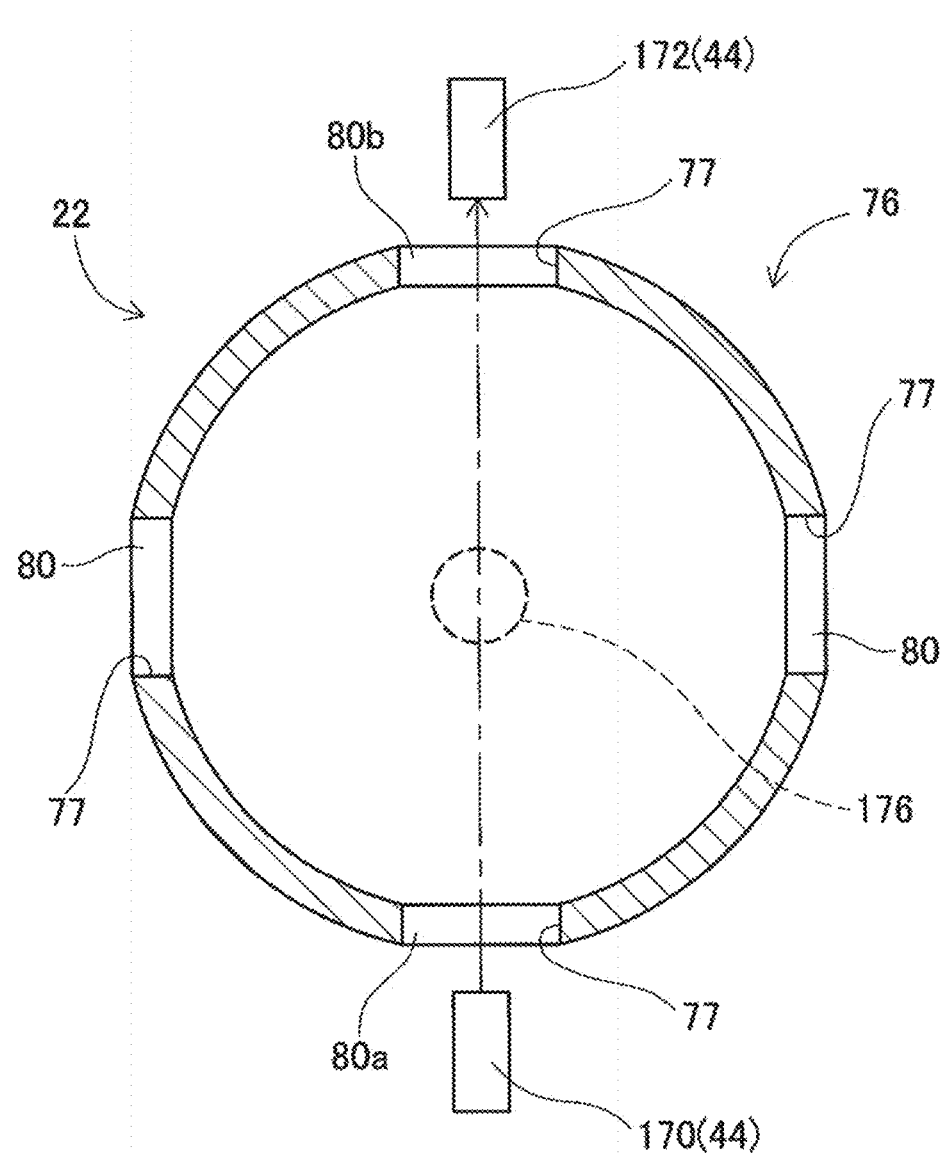
FIG. 12 is a schematic view showing a laser light measuring device.

As shown in FIG. 12, on the side surface of upper cover 76, a substantially rectangular through hole 77 is formed at 4 equidistant positions, and transparent glass plate 80 is disposed to close through hole 77. This enables the inside of upper cover 76 to be visually recognized through glass plate 80.

As shown in FIG. 5, lower cover 78 of cover housing 22 has a substantially disk-shape, and is fixed to lower housing 81 (see FIG. 10) of a placement section on which atmospheric pressure plasma irradiation apparatus 10 is placed. An outer diameter of lower cover 78 is larger than an outer diameter of upper cover 76, and annular packing 82 having the same diameter as that of upper cover 76 is disposed on an upper surface of lower cover 78. When upper cover 76 is slid downward by opening and closing mechanism 24, upper cover 76 comes into close contact with packing 82, and the inside of cover housing 22 is sealed.

Figure 6:
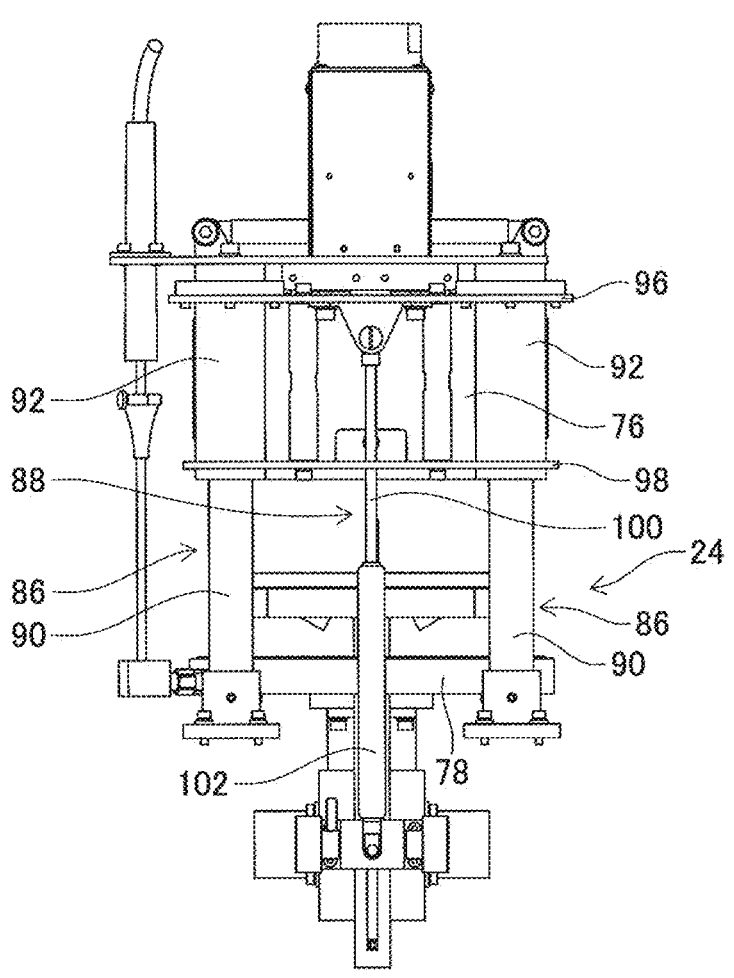
FIG. 6 is a side view of the atmospheric pressure plasma irradiation apparatus.
Figure 6:
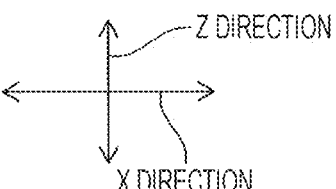
Figure 7:
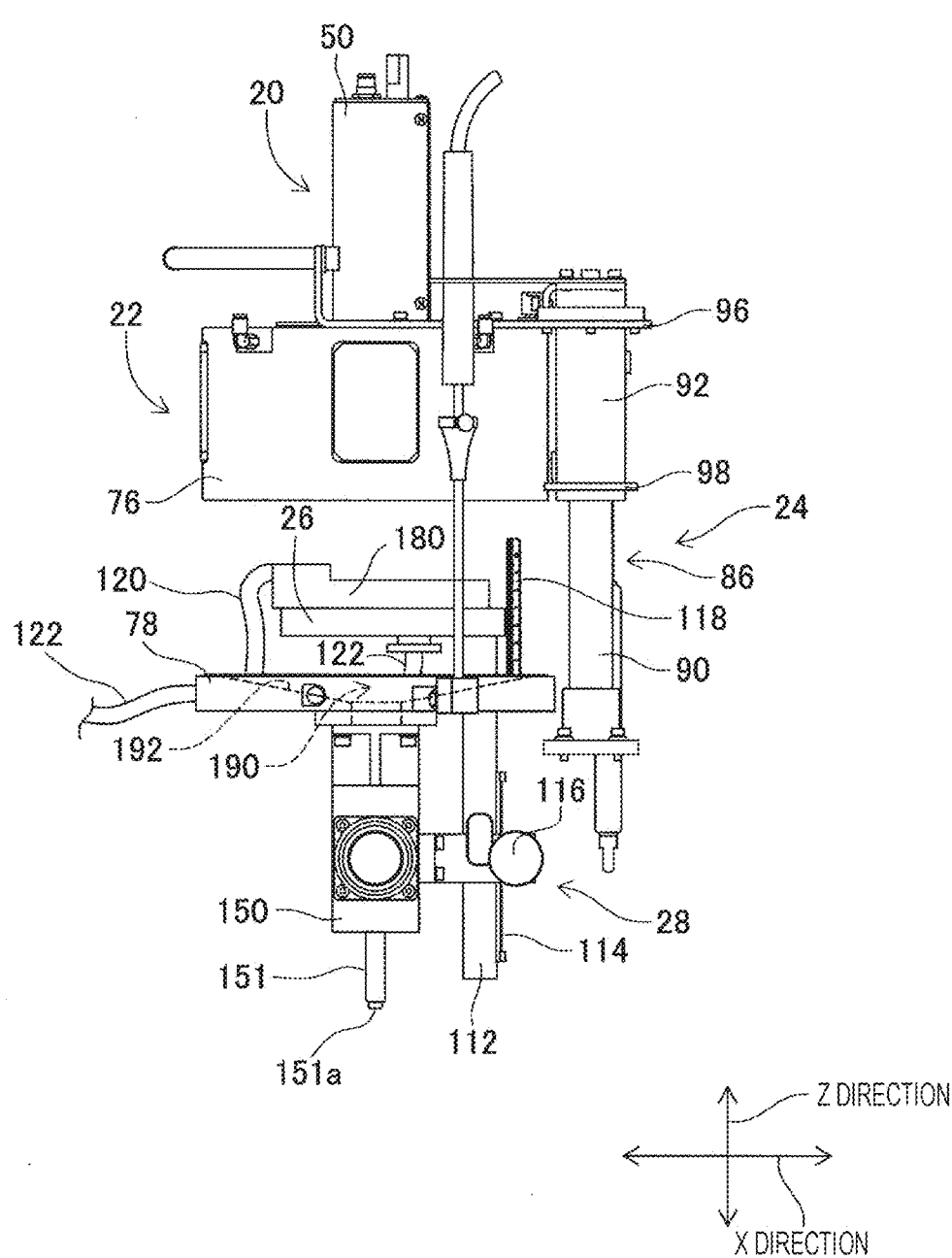
FIG. 7 is a side view of the atmospheric pressure plasma irradiation apparatus.

Specifically, as shown in FIGS. 6 and 7, opening and closing mechanism 24 includes a pair of slide mechanisms 86 and air cylinder 88. Each slide mechanism 86 includes support shaft 90 and slider 92. Support shaft 90 stands upright on lower housing 81 (see FIG. 10) to extend in the Z direction. Slider 92 has a substantially cylindrical shape and is externally fitted to support shaft 90 to be slidable in an axial direction of support shaft 90. Upper cover 76 is held by slider 92 by upper bracket 96 and lower bracket 98. Thus, upper cover 76 is slidable in the Z direction, that is, in the up-down direction.

Air cylinder 88 includes rod 100, a piston (not shown), and cylinder 102. Rod 100 is disposed to extend in the Z direction, and is fixed to upper cover 76 at an upper end portion thereof. A piston is fixed to a lower end portion of rod 100. The piston is fitted inside from the upper end of cylinder 102 and slidably moves inside cylinder 102. A lower end portion of cylinder 102 is fixed to lower housing 81 (see FIG. 10), and a predetermined amount of air is sealed inside cylinder 102.

Figure 8:
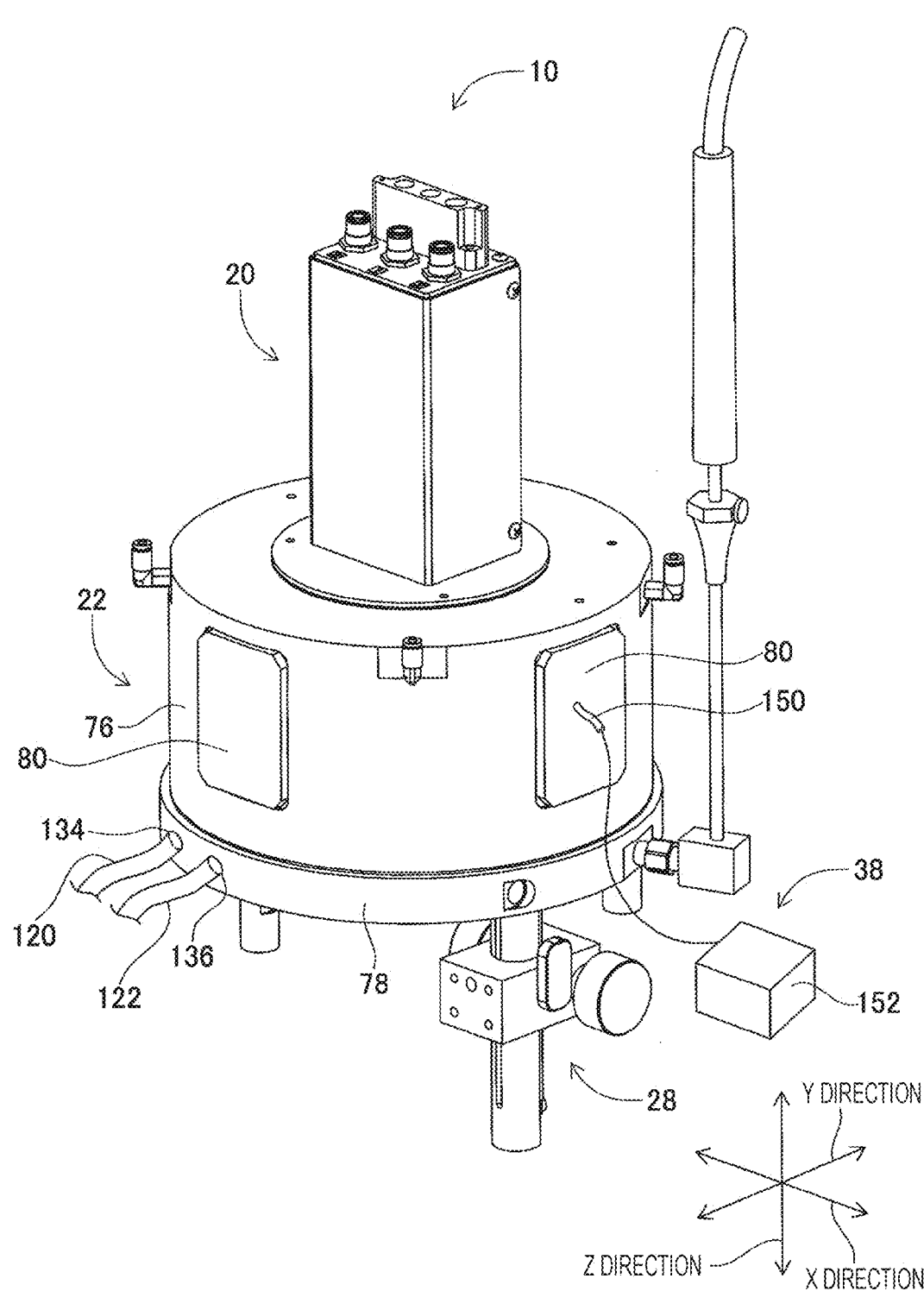
FIG. 8 is a perspective view of the atmospheric pressure plasma irradiation apparatus.

As a result, air cylinder 88 functions as a damper, and rapid descent of upper cover 76 is prevented. The air pressure inside cylinder 102 is designated as compressible pressure due to the weight of an integrated object that slides together with upper cover 76, that is, the weight of upper cover 76, plasma generating device 20, slider 92, and the like. That is, when a worker releases upper cover 76 in a state where upper cover 76 is lifted, upper cover 76 is lowered by the own weight of upper cover 76 and the like. Upper cover 76 comes into close contact with packing 82 of lower cover 78, and as shown in FIG. 8, the inside of cover housing 22 is sealed by upper cover 76 and lower cover 78.

Further, the worker lifts upper cover 76 to open the inside of cover housing 22. Magnet 106 (see FIG. 1) is fixed on an upper surface of upper cover 76, and when upper cover 76 is lifted, magnet 106 attaches to an upper housing of a placement section (not shown). In this way, by attaching magnet 106 to the upper housing, the state in which upper cover 76 is lifted, that is, the state in which cover housing 22 is opened, is maintained.

Stage 26 has a substantially disk-shape, and irradiation block 180 is placed on an upper surface of stage 26. An outer diameter of stage 26 is smaller than the outer diameter of lower cover 78. Stage 26 is disposed on the upper surface of lower cover 78.

Irradiation block 180 is used to generate a plasma-treated liquid by storing the liquid to be treated that has been delivered by liquid delivery tube 120 and irradiating the stored liquid to be treated with plasma ejected from plasma generating device 20. The generated plasma-treated liquid is discharged from irradiation block 180 by liquid discharge tube 122.

The liquid to be treated is sent out to liquid delivery tube 120 by using a supply pump (not shown) provided outside cover housing 22, and is supplied to irradiation block 180 in cover housing 22. Further, the plasma-treated liquid generated in irradiation block 180 is discharged from irradiation block 180 to liquid discharge tube 122 using a discharge pump (not shown), and is stored in a temporary storage bin (not shown) provided outside cover housing 22. Accordingly, through holes 134 and 136 are formed in a side surface of lower cover 78, through which liquid delivery tube 120 and liquid discharge tube 122 pass, respectively.

Figures 9A, 9B:
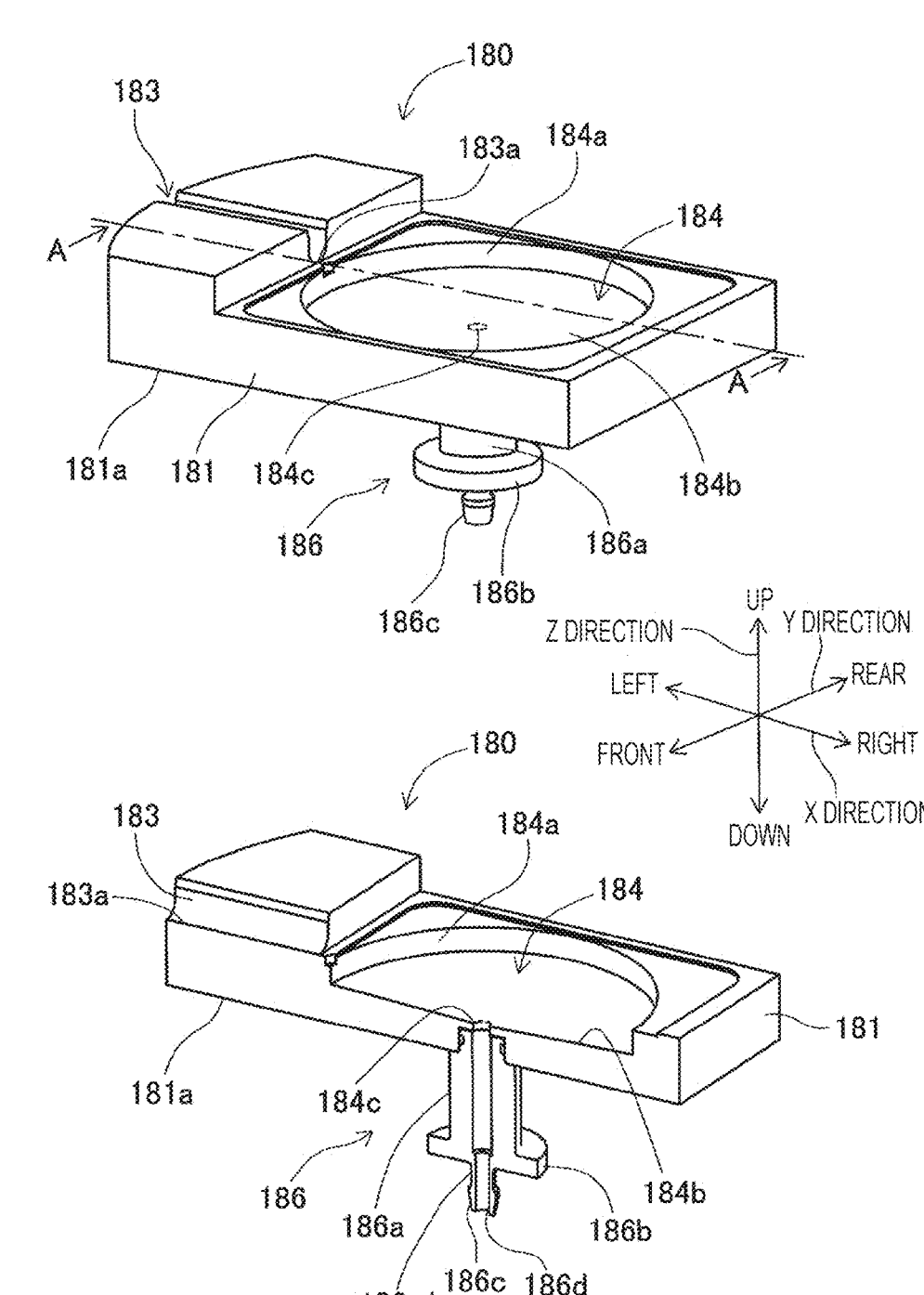
FIG. 9A is a perspective view of an irradiation block.
FIG. 9B is a cross-sectional perspective view of the irradiation block taken along line A-A.

FIG. 9 shows a schematic configuration of irradiation block 180. FIG. 9A is a perspective view showing an appearance of entire irradiation block 180, and FIG. 9B is a cross-sectional perspective view of the A-A line of FIG. 9A. The direction from left to right is the direction in which the liquid to be treated flows.

Irradiation block 180 is formed of a ceramic and includes irradiation block body section 181 having a substantially rectangular parallelepiped shape. The long side direction of irradiation block 180 is the X direction, and the short side direction is the Y direction. In irradiation block body section 181, when installed in cover housing 22, groove section 183 and storage section 184, in which surfaces facing plasma generating device 20 are opened, are formed.

Groove section 183 has a U shape whose YZ cross-section opens upward. Bottom surface 183a forming groove section 183 is curved. The YZ cross-section of groove section 183 is slightly narrower than the cross-sectional shape of liquid delivery tube 120 (see FIG. 1), and liquid delivery tube 120 is fixed by fitting flexible liquid delivery tube 120 into groove section 183.

Storage section 184 stores the liquid to be treated for plasma irradiation. Storage section 184 is formed of a cylindrical recessed section including side surface 184a and bottom surface 184b. Bottom surface 184b forming storage section 184 is formed to be positioned below bottom surface 183a forming groove section 183. Further, liquid discharge hole 184c for discharging the plasma-treated liquid generated by plasma irradiation of the liquid to be treated from storage section 184 is formed on bottom surface 184b forming storage section 184. Bottom surface 184b is an inclined surface inclined downward from side surface 184a toward liquid discharge hole 184c. This is to achieve the function of quickly discharging the plasma-treated liquid from storage section 184 and the function of preventing the remaining state of a part of the plasma-treated liquid in storage section 184 without being discharged as much as possible, when discharging the plasma-treated liquid.

Irradiation block body section 181 includes discharge section 186 in addition to the above configuration. Discharge section 186 is formed to protrude downward from a position that is lower surface 181a of irradiation block body section 181 and includes liquid discharge hole 184c of storage section 184. Discharge section 186 has base portion 186a, flange portion 186b, and discharge locking portion 186c, and each of elements 186a to 186c is integrally formed in a connected state downwardly. Further, through hole 186d is formed in the Z direction at the center of discharge section 186, and communicates with liquid discharge hole 184c of storage section 184.

On the outer peripheral surface of discharge section 186, the portion continuous with lower surface 181a of irradiation block body section 181 is base portion 186a. The diameter of the outer periphery of discharge locking portion 186c formed with flange portion 186b interposed below base portion 186a is larger than the diameter of liquid discharge tube 122 (see FIG. 1). The outer diameter of upper portion 186c1 of discharge locking portion 186c is smaller than the outer diameter of discharge locking portion 186c. Thus, when flexible liquid discharge tube 122 is fitted to upper portion 186c1, liquid discharge tube 122 is deformed along the outer periphery of discharge locking portion 186c, and liquid discharge tube 122 is fixed. Further, irradiation block 180 is fixed to stage 26 by fitting base portion 186a and cutout portion 26a of stage 26 (see FIG. 1). In this way, since it is not fixed using fasteners, irradiation block 180 can be easily attached to and detached from stage 26.

As shown in FIG. 7, lifting and lowering device 28 includes support rod 112, rack 114, pinion 116, and electromagnetic motor 117 (see FIG. 13). A through hole (not shown) penetrating in the up-down direction is formed in lower cover 78, and support rod 112 is inserted into the through hole. The outer diameter of support rod 112 is smaller than the inner diameter of the through hole, and support rod 112 is movable in the up-down direction, that is, in the Z direction. The lower surface of stage 26 is fixed to the upper end of support rod 112.

Rack 114 is fixed to an outer peripheral surface of a portion extending downward from lower cover 78 of support rod 112 so as to extend in the axial direction of support rod 112. Pinion 116 is meshed with rack 114 and is rotated by the drive of electromagnetic motor 117. Pinion 116 is rotatably held by lower housing 81 (see FIG. 10). With this structure, when pinion 116 is rotated by the drive of electromagnetic motor 117, support rod 112 moves in the Z direction, and stage 26 is lifted and lowered. Measurement rod 118 stands upright, adjacent to stage 26, on the upper surface of lower cover 78. Graduations are marked on the outer peripheral surface of measurement rod 118, and the height of stage 26 in the Z direction, that is, the lifting and lowering amount of stage 26 can be visually checked by the graduations.

As shown in FIG. 5, purge gas supply mechanism 32 includes four air joints 130 (three are shown in the drawing) and purge gas supply device 132 (see FIG. 13). Four air joints 130 are provided at four equidistant positions at the upper end portion of the side surface of upper cover 76, and each air joint 130 opens into the inside of upper cover 76. Purge gas supply device 132 is a device that supplies an inert gas such as nitrogen, and is connected to each air joint 130 via a pipe (not shown). With this structure, purge gas supply mechanism 32 supplies the inert gas into the inside of upper cover 76.

Concentration detection mechanism 34 includes air joint 140, pipe 142, and detection sensor 144 (see FIG. 13). Lower cover 78 is formed with a through hole (not shown) communicating with the upper surface and side surface of lower cover 78. Opening 146 of the through hole on the upper surface side of lower cover 78 is positioned inside packing 82. Meanwhile, air joint 140 is connected to the opening of the through hole on the side surface side of lower cover 78. Detection sensor 144 is a sensor that detects oxygen concentration and is connected to air joint 140 via pipe 142. With this structure, concentration detection mechanism 34 detects the oxygen concentration inside cover housing 22 when cover housing 22 is sealed.

Figure 10:
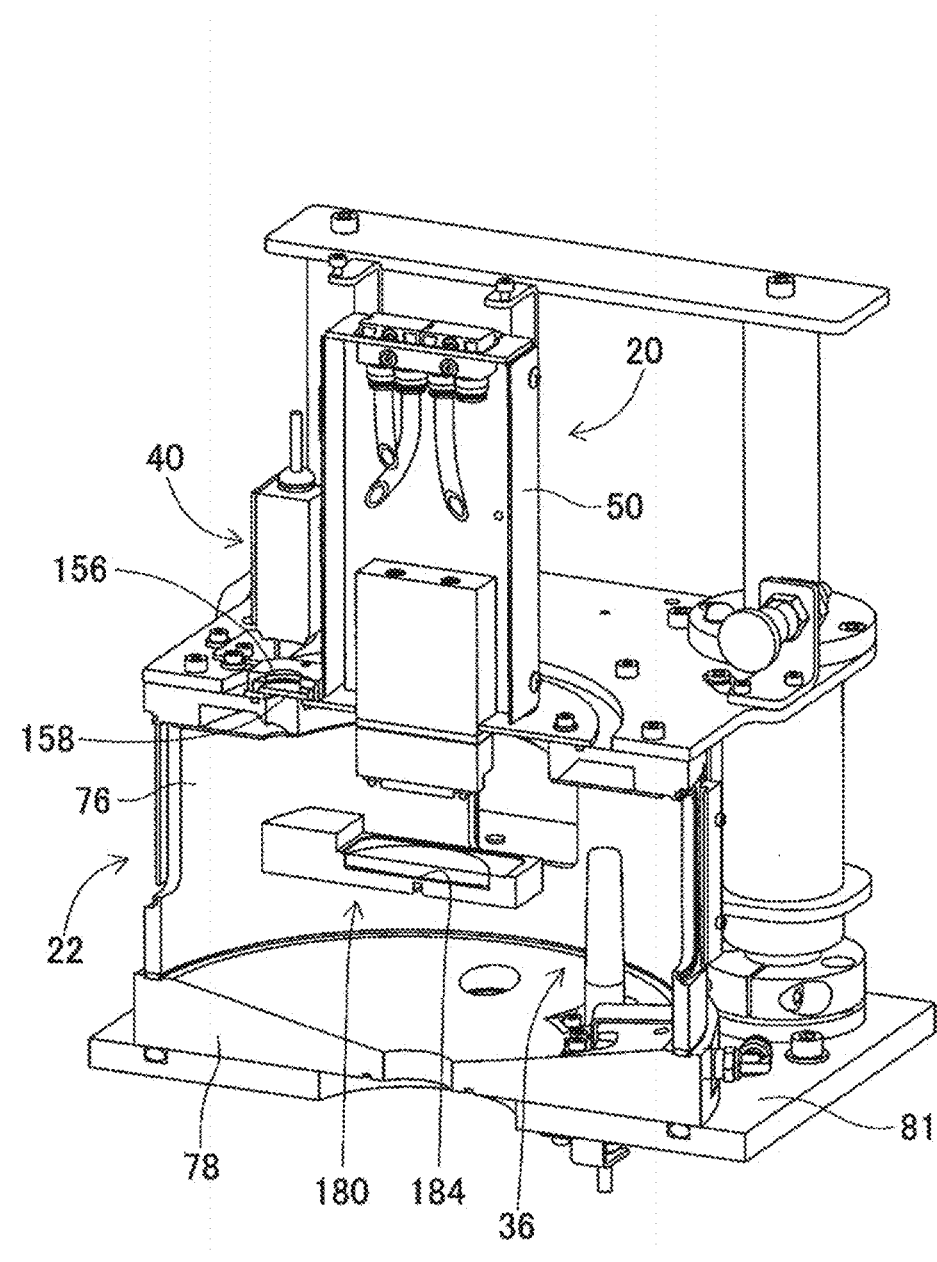
FIG. 10 is a cross-sectional view of the atmospheric pressure plasma irradiation apparatus.

Hygrometer 36 measures humidity and, as shown in FIG. 10, stands upright on the upper surface of lower cover 78. Therefore, when cover housing 22 is sealed, the humidity inside cover housing 22 is measured.

Spectrometer 38 measures the electromagnetic spectrum of the light, spectrally disperses the light for each wavelength during measurement, and measures the intensity of the light for each dispersed wavelength. Therefore, as shown in FIG. 8, spectrometer 38 includes light receiver 150 that receives light, and measuring instrument 152 that spectrally disperses the received light and measures the intensity of the received light. Light receiver 150 is disposed at a position facing glass plate 80 outside cover housing 22, and receives the plasma light generated inside cover housing 22. Measuring instrument 152 spectrally disperses the plasma light and measures the intensity of the plasma light.

As shown in FIG. 10, irradiation block temperature measuring instrument 40 measures the temperature using infrared rays and is fixed to the side surface of cover 50 of plasma generating device 20 in a state of facing downward. Cover 50 of plasma generating device 20 stands upright on the upper surface of upper cover 76, and through hole 156 is formed in the upper surface of upper cover 76 positioned below irradiation block temperature measuring instrument 40 fixed to the side surface of cover 50. Through hole 156 is formed at a place different from storage section 184 of irradiation block 180, that is, above a place where the liquid to be treated of irradiation block 180 is not stored, and transparent glass plate 158 is disposed to close through hole 156. That is, irradiation block temperature measuring instrument 40, glass plate 158, and irradiation block 180 are positioned on a straight line in the up-down direction. With such a structure, when plasma is irradiated to the liquid to be treated stored in the irradiation block, irradiation block temperature measuring instrument 40 measures the temperature of irradiation block 180 using infrared rays emitted from the irradiation block. Since the inside of cover housing 22 has a high temperature due to the plasma irradiation, irradiation block temperature measuring instrument 40 is disposed outside cover housing 22, thereby preventing damage, failure, and the like of irradiation block temperature measuring instrument 40.

Figure 11:
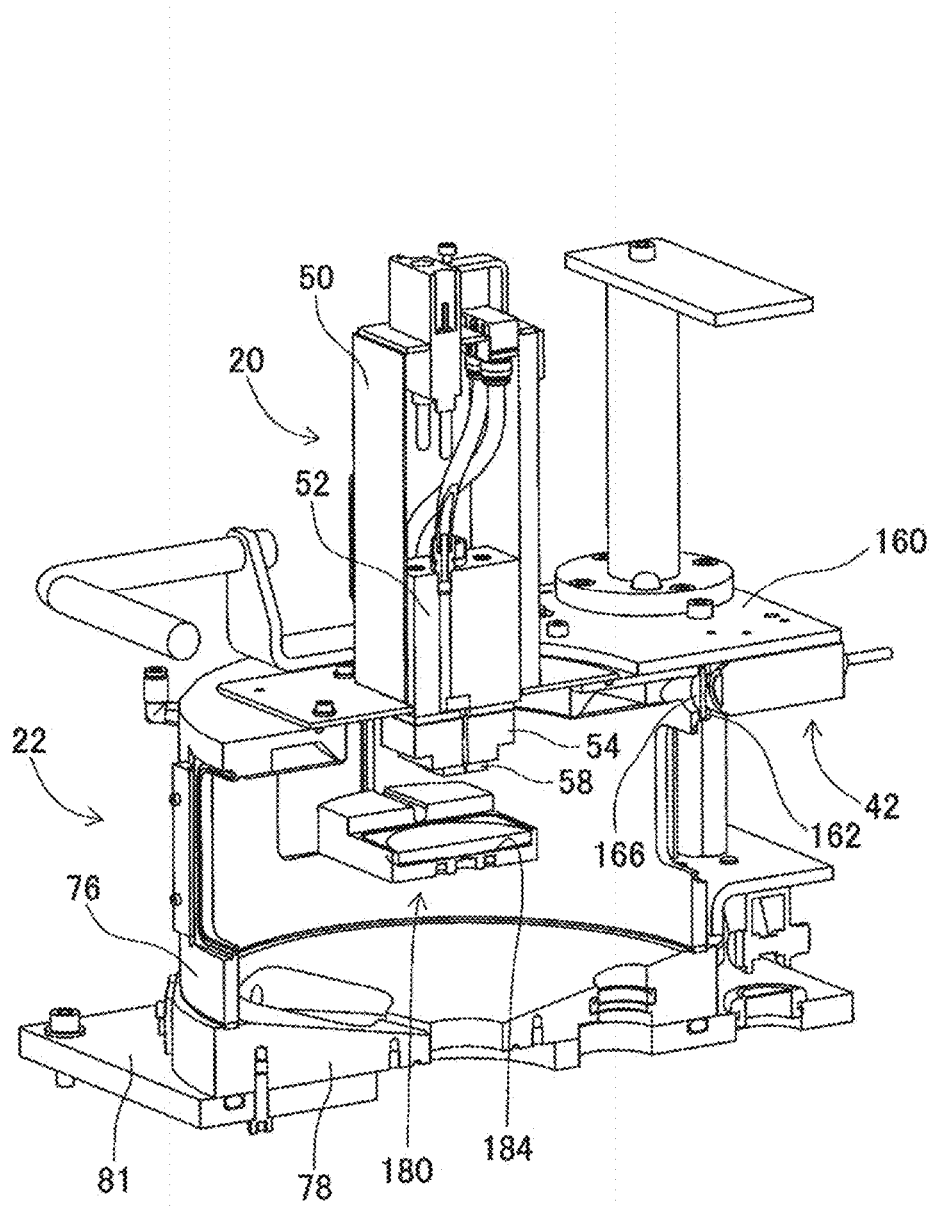
FIG. 11 is a cross-sectional view of the atmospheric pressure plasma irradiation apparatus.

Device temperature measuring instrument 42 also measures the temperature using infrared rays and, as shown in FIG. 11, is disposed in an orientation facing the side surface of upper cover 76 outside upper cover 76. Bracket 160 extending from the side edge of the upper surface of upper cover 76 toward the outside is fixed to the upper surface of upper cover 76, and device temperature measuring instrument 42 is fixed to the lower surface of bracket 160 in an orientation in which device temperature measuring instrument 42 faces the side surface of upper cover 76. Through hole 162 is formed on the side surface of upper cover 76 facing device temperature measuring instrument 42, and device temperature measuring instrument 42 corresponds to lower block 54 of plasma generating device 20 via through hole 162. Transparent glass plate 164 is disposed to close through hole 162. That is, device temperature measuring instrument 42, glass plate 164, and lower block 54 of plasma generating device 20 are positioned on a straight line in the left-right direction. With such a structure, when plasma generating device 20 irradiates plasma, device temperature measuring instrument 42 measures the temperature of plasma generating device 20 using infrared rays emitted from lower block 54 of plasma generating device 20. Since the inside of cover housing 22 has a high temperature due to the plasma irradiation, device temperature measuring instrument 42 is disposed outside cover housing 22, thereby preventing damage, failure, and the like of device temperature measuring instrument 42.

As shown in FIG. 12, laser light measuring device 44 includes irradiator 170 that irradiates laser light, and light receiver 172 that receives the laser light irradiated from irradiator 170. Irradiator 170 is disposed at a position facing one glass plate 80a of four glass plates 80 fitted into upper cover 76 outside cover housing 22, and emits the laser light through glass plate 80a toward plasma 176 generated at the center inside the cover housing. Further, light receiver 172 is disposed at a position facing glass plate 80b, which is positioned on the opposite side of glass plate 80a on which irradiator 170 is disposed, among four glass plates 80 fitted into upper cover 76 outside cover housing 22. That is, irradiator 170 and light receiver 172 are disposed to interpose two glass plates 80a and 80b, which are symmetrically disposed around plasma 176 generated inside cover housing 22. Therefore, light receiver 172 receives the laser light irradiated by irradiator 170 toward plasma 176. Light receiver 172 spectrally disperses the received laser light for each wavelength and measures the intensity of the received laser light. Since the inside of cover housing 22 has a high temperature due to the plasma irradiation, laser light measuring device 44 is disposed outside cover housing 22, thereby preventing damage, failure, and the like of laser light measuring device 44.

As shown in FIG. 1, exhaust mechanism 46 includes L-shaped pipe 187, connecting pipe 188, and main pipe 189. As shown in FIG. 7, lower cover 78 is formed with duct port 190 opening into the upper surface and the lower surface. The opening of duct port 190 on the upper surface side of lower cover 78 is configured with tapered surface 192 where inner diameter increases as it extends upward. That is, when cover housing 22 is sealed, tapered surface 192 is inclined toward the inner wall surface of upper cover 76. Meanwhile, L-shaped pipe 187 is connected to the opening of duct port 190 on the lower surface side of lower cover 78. Main pipe 189 is connected to L-shaped pipe 187 via connecting pipe 188. A portion of connecting pipe 188 on L-shaped pipe 187 side is omitted. Ozone filter 196 is disposed inside main pipe 189. Ozone filter 196 is formed with activated charcoal, which adsorbs ozone.

Control device 48 includes controller 200 and multiple drive circuits 202 as shown in FIG. 13. Multiple drive circuits 202 are connected to electrode 56, processing gas supply device 74, electromagnetic motor 117, and purge gas supply device 132. Controller 200 includes CPU, ROM, RAM, and the like, is mainly a computer, and is connected to multiple drive circuits 202. Thus, operations of plasma generating device 20, lifting and lowering device 28, and purge gas supply mechanism 32 are controlled by controller 200. Controller 200 is connected to hygrometer 36 and acquires a measurement result from hygrometer 36, that is, the humidity inside cover housing 22. Controller 200 is connected to irradiation block temperature measuring instrument 40, and acquires the measurement result of irradiation block temperature measuring instrument 40, that is, the temperature of irradiation block 180. Controller 200 is connected to device temperature measuring instrument 42, and acquires the measurement result of device temperature measuring instrument 42, that is, the temperature of plasma generating device 20. Controller 200 is connected to detection sensor 144 of concentration detection mechanism 34, and acquires the detection result of detection sensor 144, that is, the oxygen concentration inside cover housing 22. Controller 200 is connected to measuring instrument 152 of spectrometer 38, and acquires the measurement result of measuring instrument 152, that is, the intensity of each wavelength of the plasma light. Controller 200 is connected to laser light measuring device 44 and acquires the measurement result of laser light measuring device 44, that is, the intensity of each wavelength of the laser light.

In atmospheric pressure plasma irradiation apparatus 10 configured as described above, since the culture solution is activated by irradiating the culture solution with plasma, utilization of plasma in the medical field such as cancer treatment using the culture solution irradiated with plasma is expected. Therefore, processes such as the generation of culture solution irradiated with plasma are performed, but it is preferable that the culture solution is irradiated with plasma in a state where the conditions for the plasma irradiation are managed. In atmospheric pressure plasma irradiation apparatus 10, with the above-described configuration, by placing irradiation block 180 on stage 26 and sealing cover housing 22, it is possible to irradiate the culture solution with plasma under predetermined conditions. Hereinafter, a method of irradiating the culture solution with plasma under predetermined conditions will be described in detail.

Specifically, first, irradiation block 180 is placed on stage 26. Next, lifting and lowering device 28 lifts and lowers stage 26 to an arbitrary height. Accordingly, it is possible to arbitrarily set the distance between plasma ejection port 72 and the culture solution as plasma irradiation target. The lifting and lowering height of stage 26 can be confirmed by the graduations of measurement rod 118.

Next, upper cover 76 is lowered to seal cover housing 22. Then, an inert gas is supplied to the inside of cover housing 22 by purge gas supply mechanism 32. At this time, oxygen concentration in cover housing 22 is detected by concentration detection mechanism 34. Then, after the detected oxygen concentration becomes equal to or lower than a threshold set in advance, plasma is ejected into the inside of cover housing 22 by plasma generating device 20. At this time, plasma is irradiated toward irradiation block 180 disposed below nozzle block 58 of plasma generating device 20. Even when the plasma is irradiated, the supply of the inert gas into the inside of cover housing 22 is continuously performed.

In addition, the liquid to be treated adjusted to a constant flow rate is caused to flow to storage section 184 of irradiation block 180 through liquid delivery tube 120. When a predetermined amount of the liquid to be treated is stored in storage section 184, the liquid delivery to storage section 184 is stopped. Then, the liquid to be treated stored in storage section 184 is irradiated with the plasma gas from plasma generating device 20, so that the liquid to be treated is activated.

When plasma generating device 20 irradiates irradiation block 180 with the plasma gas, irradiation block temperature measuring instrument 40 measures the temperature of irradiation block 180. Therefore, it is possible to confirm the temperature of irradiation block 180 during plasma irradiation. Further, when plasma generating device 20 irradiates irradiation block 180 with the plasma gas, the temperature of lower block 54 of plasma generating device 20 is measured using device temperature measuring instrument 42. Therefore, it is possible to confirm the temperature of plasma generating device 20 during plasma irradiation.

Further, when plasma generating device 20 irradiates irradiation block 180 with the plasma gas, the intensity of the plasma light of the plasma gas irradiated by plasma generating device 20 is measured using spectrometer 38. The intensity of the plasma light measured using spectrometer 38 is measured for each wavelength as described above. Meanwhile, when the processing gas is converted into plasma in plasma generating device 20, light having a predetermined wavelength is emitted. Therefore, it is possible to confirm the excitation reaction state of the plasma gas by measuring the intensity of the plasma light measured for each wavelength. That is, by measuring the intensity of the plasma light measured for each wavelength, it is possible to confirm whether the processing gas is properly converted into plasma.

When plasma generating device 20 irradiates irradiation block 180 with the plasma gas, laser light measuring device 44 irradiates the plasma gas with the laser light, and the intensity of the laser light is measured. The intensity of the laser light measured using laser light measuring device 44 is measured for each wavelength as described above. Meanwhile, when the plasma gas is irradiated with the laser light, the laser light having a specific wavelength is absorbed by the plasma gas according to the components of the plasma gas. Therefore, by measuring the intensity of the laser light measured for each wavelength, it is possible to confirm the components of the plasma gas.

Even when plasma generating device 20 irradiates irradiation block 180 with the plasma gas, the oxygen concentration in cover housing 22 is detected by concentration detection mechanism 34. Therefore, it is also possible to confirm the oxygen concentration in cover housing 22 during plasma irradiation. Further, when plasma generating device 20 irradiates irradiation block 180 with the plasma gas, the humidity inside cover housing 22 is also detected by hygrometer 36. Therefore, it is also possible to confirm the humidity inside cover housing 22 during plasma irradiation.

As described above, in atmospheric pressure plasma irradiation apparatus 10, irradiation block 180 is irradiated with the plasma gas while measuring the temperature of irradiation block 180, the temperature of plasma generating device 20, the excitation reaction state of the plasma gas, the components of the plasma gas, and the oxygen concentration and the humidity in cover housing 22. It has been found that by irradiating the liquid to be treated with the plasma gas for a predetermined time, the therapeutic effect by the liquid to be treated irradiated with plasma is exerted. Therefore, the liquid to be treated stored in storage section 184 is irradiated with the plasma gas for a predetermined time. Further, the liquid to be treated is naturally convected in storage section 184 by being irradiated with the plasma gas. Accordingly, it is possible to obtain a uniform activated plasma-treated liquid in which the therapeutic effect is exerted.

Then, when a predetermined time elapses after plasma irradiation of the liquid to be treated is started, the plasma-treated liquid stored in storage section 184 is discharged by the operation of the discharge pump through liquid discharge tube 122. At this time, when a predetermined time elapses after the discharge of the plasma-treated liquid from storage section 184 is started, it is considered that the plasma-treated liquid does not remain in storage section 184, and the discharge of the plasma-treated liquid from storage section 184 is completed. Then, the liquid to be treated for the next plasma treatment is supplied to storage section 184 of irradiation block 180 by the operation of the supply pump through liquid delivery tube 120. Hereinafter, the plasma treatment, including the plasma irradiation for a predetermined time of the liquid to be treated stored in storage section 184, the discharge of the plasma-treated liquid, the supply of the new liquid to be treated to irradiation block 180, the plasma irradiation of the liquid to be treated, and so forth, is repeatedly performed until a target amount of the plasma-treated liquid is generated.

As described above, in atmospheric pressure plasma irradiation apparatus 10, by supplying the inert gas into the inside of cover housing 22, the air in cover housing 22 is exhausted to the outside of cover housing 22. At this time, by adjusting the oxygen concentration in cover housing 22, conditions that affect plasma irradiation are managed. Specifically, since plasma contains active radicals, in a case where plasma reacts with oxygen, ozone is produced, and as a result, an effect of plasma irradiation is lowered. Therefore, by adjusting the oxygen concentration in cover housing 22 before plasma irradiation and during plasma irradiation, the influence of the oxygen concentration on the effect of the culture solution irradiated with plasma can be investigated. In addition, the culture solution can be irradiated with plasma under the same conditions. Accordingly, it is possible to efficiently and reproducibly generate the plasma-treated liquid.

In atmospheric pressure plasma irradiation apparatus 10, the distance between plasma ejection port 72 and the culture solution is arbitrarily set. Accordingly, it is possible to investigate the influence of the irradiation distance on the effect of the culture solution irradiated with plasma, and to efficiently and reproducibly generate the plasma-treated liquid.

In atmospheric pressure plasma irradiation apparatus 10, when plasma generating device 20 irradiates irradiation block 180 with the plasma gas, the temperature of irradiation block 180 and the temperature of plasma generating device 20 are measured. Accordingly, it is possible to investigate the influence of the temperature on the effect of the culture solution irradiated with plasma, and to efficiently and reproducibly generate the plasma-treated liquid.

In atmospheric pressure plasma irradiation apparatus 10, when plasma generating device 20 irradiates irradiation block 180 with the plasma gas, the humidity inside cover housing 22 is also measured. Accordingly, it is possible to investigate the influence of the humidity on the effect of the culture solution irradiated with plasma, and to efficiently and reproducibly generate the plasma-treated liquid.

In atmospheric pressure plasma irradiation apparatus 10, when plasma generating device 20 irradiates irradiation block 180 with the plasma gas, the intensity of the plasma light of the plasma gas is measured using spectrometer 38. Accordingly, it is possible to confirm the excitation reaction state of the plasma gas, and to efficiently and reproducibly generate the plasma-treated liquid.

In atmospheric pressure plasma irradiation apparatus 10, when plasma generating device 20 irradiates irradiation block 180 with the plasma gas, laser light measuring device 44 irradiates the plasma gas with the laser light, and the intensity of the laser light is measured. Accordingly, it is possible to confirm the components of the plasma gas, and to efficiently and reproducibly generate the plasma-treated liquid.

Duct port 190 is formed in lower cover 78. Therefore, by supplying inert gas into cover housing 22, the inside of cover housing 22 becomes a positive pressure and is naturally exhausted from the inside of cover housing 22. Tapered surface 192 having an inner diameter larger toward the upper surface of lower cover 78 is formed in duct port 190 of lower cover 78. Accordingly, it is possible to promote the exhaustion of the gas from the inside of cover housing 22. Further, exhaust mechanism 46 is provided with ozone filter 196. Accordingly, even when plasma and oxygen react and ozone is generated, it is possible to prevent the ozone from being exhausted to the outside.

As shown in FIG. 13, controller 200 of control device 48 includes irradiation section 210 and temperature measuring section 212. Irradiation section 210 is a functional section that irradiates the liquid to be treated stored in irradiation block 180 with plasma gas. Temperature measuring section 212 is a functional section that measures the temperature of irradiation block 180 when the liquid to be treated stored in irradiation block 180 is irradiated with the plasma gas.

In the example described above, atmospheric pressure plasma irradiation apparatus 10 is an example of a plasma irradiation apparatus. Plasma generating device 20 is an example of a plasma generating device. Cover housing 22 is an example of a housing. Hygrometer 36 is an example of a humidity measuring instrument. Spectrometer 38 is an example of a spectrometer. Irradiation block temperature measuring instrument 40 is an example of a container temperature measuring instrument. Device temperature measuring instrument 42 is an example of a device temperature measuring instrument. Laser light measuring device 44 is an example of a laser light measuring device. Through hole 77 is an example of a through hole. Glass plate 80 is an example of a transparent member. Through hole 156 is an example of a through hole. Glass plate 158 is an example of a transparent member. Irradiator 170 is an example of an irradiation section. Light receiver 172 is an example of a light receiving section. Irradiation block 180 is an example of a container. A step executed by irradiation section 210 is an example of an irradiation step. The step executed by temperature measuring section 212 is an example of a temperature measurement step.

The present embodiment, which has been described heretofore, provides the following effects.

Atmospheric pressure plasma irradiation apparatus 10 includes irradiation block 180 configured to store a liquid to be treated, plasma generating device 20 configured to generate plasma to irradiate the liquid to be treated stored in irradiation block 180, and irradiation block temperature measuring instrument 40 configured to measure a temperature of irradiation block 180. Accordingly, it is possible to investigate the influence of the temperature of irradiation block 180 on the effect of the culture solution irradiated with plasma, and to efficiently and reproducibly generate the plasma-treated liquid.

Atmospheric pressure plasma irradiation apparatus 10 includes device temperature measuring instrument 42 configured to measure a temperature of plasma generating device 20. Accordingly, it is possible to investigate the influence of the temperature of plasma generating device 20 on the effect of the culture solution irradiated with plasma, and to efficiently and reproducibly generate the plasma-treated liquid.

Through hole 156 is formed in cover housing 22, and glass plate 158 is fitted into through hole 156. Irradiation block temperature measuring instrument 40 is disposed outside cover housing 22, and measures the temperature of irradiation block 180 through glass plate 158. As a result, irradiation block temperature measuring instrument 40 is disposed outside cover housing 22, not inside cover housing 22 at a high temperature, thereby preventing damage, failure, and the like of irradiation block temperature measuring instrument 40.

Atmospheric pressure plasma irradiation apparatus 10 includes spectrometer 38 configured to measure an intensity of the plasma generated by plasma generating device 20. Accordingly, it is possible to confirm the excitation reaction state of the plasma gas, and to efficiently and reproducibly generate the plasma-treated liquid.

Atmospheric pressure plasma irradiation apparatus 10 includes laser light measuring device 44, and laser light measuring device 44 includes irradiator 170 that irradiates the plasma generated by plasma generating device 20 with laser light, and light receiver 172 that receives the laser light irradiated by irradiator 170. Then, the components of plasma are calculated based on the intensity of the laser light received by light receiver 172. Accordingly, it is possible to efficiently and reproducibly generate the plasma-treated liquid.

A pair of through holes 77 are formed in cover housing 22, and a pair of glass plates 80 are fitted into the pair of through holes 77. Irradiator 170 of laser light measuring device 44 is disposed outside cover housing 22, and emits laser light toward plasma through one of the pair of glass plates 80. Light receiver 172 of laser light measuring device 44 is also disposed outside cover housing 22, and receives the laser light irradiated from irradiator 170 through one of the pair of glass plates 80. In this way, laser light measuring device 44 is disposed outside cover housing 22, not inside cover housing 22 at a high temperature, thereby preventing damage, failure, and the like of laser light measuring device 44.

Atmospheric pressure plasma irradiation apparatus 10 includes hygrometer 36 configured to measure the humidity inside cover housing 22. Accordingly, it is possible to investigate the influence of the humidity on the effect of the culture solution irradiated with plasma, and to efficiently and reproducibly generate the plasma-treated liquid.

The present disclosure is not limited to the example described above, and can be carried out in various aspects to which various modifications and improvements are applied based on the knowledge of those skilled in the art. For example, in the above example, the liquid to be treated is irradiated with plasma inside sealed cover housing 22, but the liquid to be treated may be irradiated with plasma in an open space. In the above example, the liquid to be treated is irradiated with plasma under atmospheric pressure, but the liquid to be treated may be irradiated with plasma under reduced pressure.

In the above example, the culture solution is adopted as the liquid to be treated, but it is possible to adopt a liquid other than the culture solution as the liquid to be treated. In addition, the present disclosure is not limited to the medical field, and the present disclosure can be applied to various fields such as an industrial field.

In the above example, hygrometer 36, spectrometer 38, irradiation block temperature measuring instrument 40, device temperature measuring instrument 42, and laser light measuring device 44 are disposed in atmospheric pressure plasma irradiation apparatus 10. Alternatively, at least one of hygrometer 36, spectrometer 38, irradiation block temperature measuring instrument 40, device temperature measuring instrument 42, and laser light measuring device 44 may be provided in atmospheric pressure plasma irradiation apparatus 10.

REFERENCE SIGNS LIST

10: atmospheric pressure plasma irradiation apparatus (plasma irradiation apparatus), 20: plasma generating device, 22: cover housing (housing), 36: hygrometer (humidity measuring instrument), 38: spectrometer, 40: irradiation block temperature measuring instrument (container temperature measuring instrument), 42: device temperature measuring instrument, 44: laser light measuring device, 77: through hole, 80: glass plate (transparent member), 156: through hole, 158: glass plate (transparent member), 170: irradiator (irradiation section), 172: light receiver (light receiving section), 180: irradiation block (container), 210: irradiation section (irradiation step), 212: temperature measuring section (temperature measurement step)

The invention claimed is:

1. A plasma irradiation apparatus comprising:
a container configured to store a liquid to be treated;
a plasma generating device configured to generate plasma to irradiate the liquid to be treated stored in the container; and
a container temperature measuring instrument configured to measure a temperature of the container.

2. The plasma irradiation apparatus according to claim 1, further comprising:
a device temperature measuring instrument configured to measure a temperature of the plasma generating device.

3. The plasma irradiation apparatus according to claim 1, further comprising:
a housing that covers the container, and
the container temperature measuring instrument is disposed outside the housing and configured to measure the temperature of the container through a transparent member fitted into a through hole formed in the housing.

4. The plasma irradiation apparatus according to claim 1, further comprising:
a spectrometer configured to measure an intensity of the plasma generated by the plasma generating device.

5. The plasma irradiation apparatus according to claim 1, further comprising:
a laser light measuring device that includes an irradiation section configured to emit laser light toward the plasma generated by the plasma generating device, and a light receiving section configured to receive the laser light emitted from the irradiation section, and is configured to measure an intensity of the laser light.

6. The plasma irradiation apparatus according to claim 5, further comprising:
a housing that covers the container and having a pair of through holes formed at positions interposing the container, and
the laser light measuring device that includes the irradiation section that is disposed outside the housing and configured to emit the laser light through a transparent member fitted into a first one of the pair of through holes, and the light receiving section that is disposed outside the housing and configured to receive the laser light through a transparent member fitted to a second one of the pair of through holes.

7. The plasma irradiation apparatus according to claim 1, further comprising:
a housing that covers the container; and
a humidity measuring instrument configured to measure humidity inside the housing.

8. The plasma irradiation apparatus according to claim 1, further comprising:
a spectrometer configured to measure an intensity of the plasma generated by the plasma generating device.

9. The plasma irradiation apparatus according to claim 1, further comprising:
a laser light measuring device that includes an irradiation section configured to emit laser light toward the plasma generated by the plasma generating device, and a light receiving section configured to receive the laser light emitted from the irradiation section, and is configured to measure an intensity of the laser light.

10. A plasma irradiation apparatus comprising:
a container configured to store a liquid to be treated;
a housing that covers the container;
a plasma generating device configured to generate plasma to irradiate the liquid to be treated stored in the container; and
a humidity measuring instrument configured to measure humidity inside the housing.

11. A plasma-treated liquid production method comprising:
an irradiation step of irradiating a liquid to be treated stored in a container with plasma; and
a temperature measurement step of measuring a temperature of the container when the liquid to be treated stored in the container is irradiated with the plasma in the irradiation step,
wherein a plasma-treated liquid is produced by irradiation of the plasma in the irradiation step.

* * * * *